Nov. 17, 1953

G. A. LYON 2,659,459

BRAKE DRUM AIR COOLING DEVICE

Filed July 12, 1949

Inventor
GEORGE ALBERT LYON

Nov. 17, 1953  G. A. LYON  2,659,459
BRAKE DRUM AIR COOLING DEVICE
Filed July 12, 1949  2 Sheets-Sheet 2
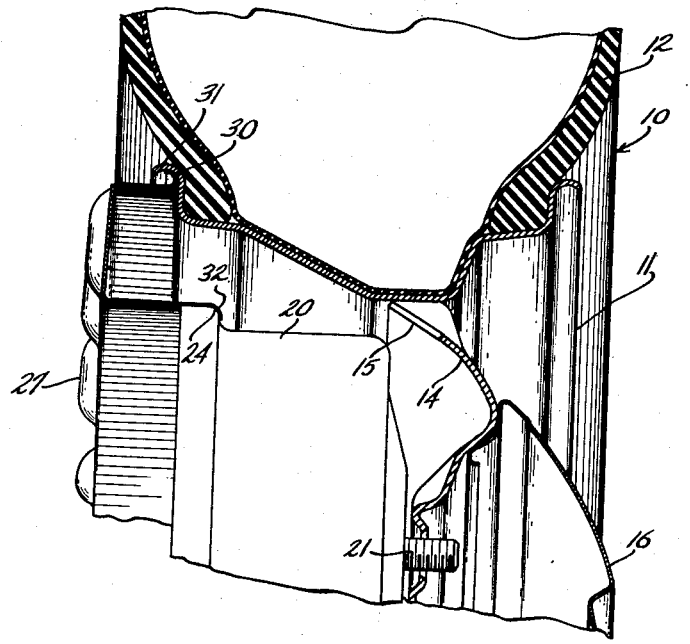
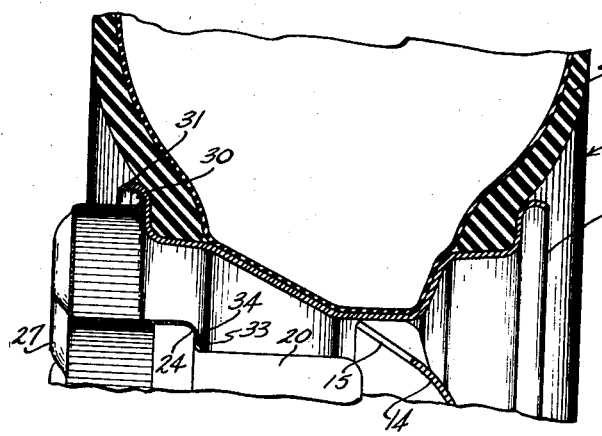
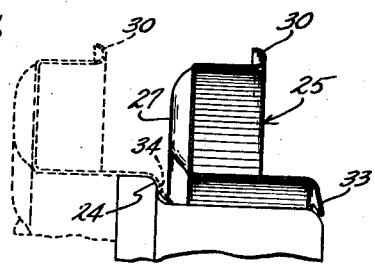
Inventor
GEORGE ALBERT LYON Patented Nov. 17, 1953

2,659,459

UNITED STATES PATENT OFFICE 2,659,459

BRAKE DRUM AIR COOLING DEVICE

George Albert Lyon, Detroit, Mich.

Application July 12, 1949, Serial No. 104,348

9 Claims. (Cl. 188—264)

The present invention relates to a device for attachment to a wheel structure to cool a brake housing by creating a flow of air through the wheel structure and over the brake housing.

More particularly, the present invention relates to a device for cooling brake assemblies, which device may be easily attached to the wheel structure and which need not be disturbed by the removal of the wheel.

An object of the present invention is to provide a device for the air cooling of vehicle brake assemblies.

Another object is to provide a device which may be easily and securely inserted into a conventional wheel structure to thereby provide air cooling for the brake assembly located therein.

A further object of the invention is to provide a device for the air cooling of brake assemblies which is readily mountable within a wheel structure in fixed position and which retains itself in position during the removal of the tire rim and tire.

A further description of the device of the present invention will be made in connection with the description of the attached sheets of drawings, in which:

Figure 4 is a fragmentary sectional view similar to Figure 1 and illustrating a stage in the attachment of the device to the rim of a wheel;

Figure 5 is a fragmentary sectional view of a modified cooling device of the present invention; and Figure 6 is a fragmentary view showing, in particular, the configuration of the holding means of the cooling device illustrated in Figure 5.

As shown on the drawings:

Figure 1:
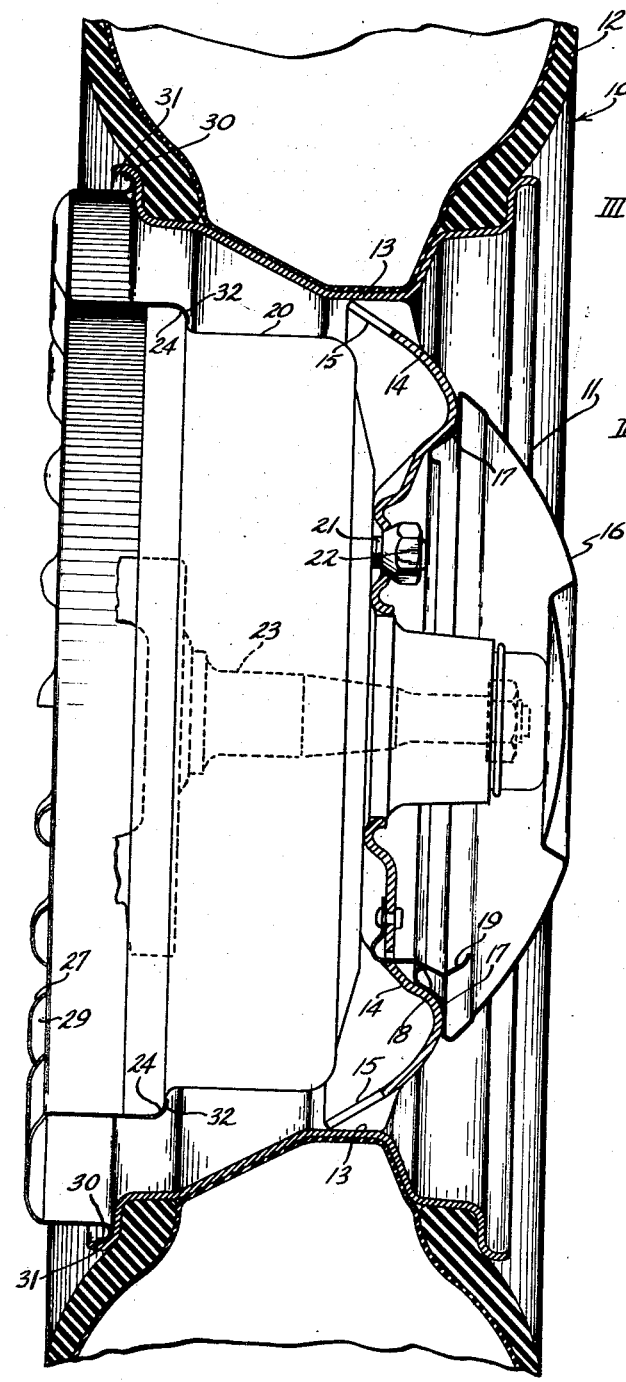
Figure 1 is a sectional view with part in elevation, showing the attachment of the brake cooling device in conjunction with the brake housing and automobile tire rim.

Reference numeral 10 denotes, in general, a wheel structure containing a multi-flange, drop-center type tire rim 11 carrying a tire 12. The tire rim 11 is connected by riveting or welding through a base flange 13 to the central body portion or spider 14. The spider 14 has provided therein a series of apertures 15 spaced radially about said spider to permit the flow of air through the assembly as will be hereinafter described.

A hub cap 16 is secured to the outer side of the spider 14 by means of a snap fit between flange portion 17 of the hub cap 16 and a corresponding flange portion on the spider 14. In addition, an upturned lip portion 18 of the hub cap 16 is in resilient frictional engagement with a plurality of retaining spring fingers 19, of which one is shown in Figure 1, secured to and extending from the spider 14.

The tire rim assembly is removably secured to a brake housing 20 by means of bolts 21 extending from the brake housing 20 and locking nuts 22. The brake housing 20 is disposed coaxially about a spindle 23 forming a part of a vehicle axle assembly.

The brake housing 20 is provided with rounded shoulder portions 24 which serve as the supporting means for the brake cooling device 25 of the present invention.

Figure 2:
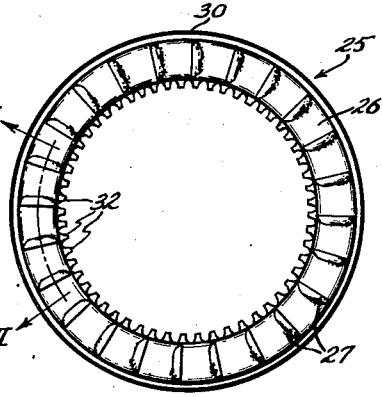
Figure 2 is a plan view of the cooling device by itself.
Figure 3:
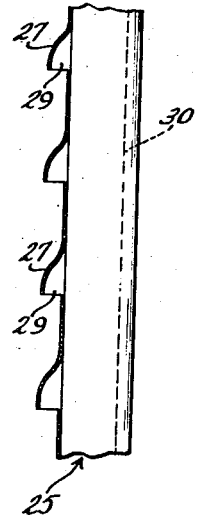
Figure 3 is a view taken substantially along the line III—III of Figure 2.

The device 25 is mounted in operation at the inner side of the wheel and preferably in such manner that it promotes circulation of air from the inner side of the wheel into the space between the tire rim 11 and the brake drum or housing 20 to cool the brake drum and then exit outwardly through the wheel by way of the wheel openings 15. To this end the cooling device 25 is preferably composed of a resilient metal stamping and, as best shown in Figures 2 and 3, comprises a ring 26 provided with a plurality of louvres 27 disposed radially along its inner face. The louvres 27 may be most conveniently formed by pressing out portions of the ring 26 leaving a series of cup-like projections defining openings 29 for the passage of air therethrough.

The outer periphery of the cooling device 25 comprises an axially extending flange the free end margin of which is formed into an annular return bent lip portion 30, which is arranged to frictionally engage the inner terminal flange portion 31 of the tire rim 11. The annular lip portion 30 is dimensioned complementary to the tire rim terminal flange and is sprung into the same so that upon mating of the lip portion 30 with the terminal flange portion 31 of the rim 11, a snug, frictional engagement is accomplished.

The radially inner portion of the ring 26 is formed into a generally axially extending flange having a series of finger-like members 32 which project into the interior of the wheel structure and are arranged to overlie the shoulder 24 of the brake housing in frictional engagement.

The mounting of the device within a wheel structure is quite simple. With the tire rim 11 removed, the cooling device 25 is inserted into the wheel structure so that the fingers 32 engage the annular shoulder 24 of the brake housing 20. Next, the tire rim 11 is inserted into position over the bolts 21 and pressed inwardly until the terminal flange portion 31 of the rim contacts the outer annular lip 30 formed on the cooling device 25, a condition shown in Figure 4. The pressure of the tire rim 11 against the lip 30 will cause the sprung lip 30 to firmly nestle within the terminal flange portion 31 of the tire rim 11, and to assume the position shown in Figure 1. The assembly may then be locked into position by tightening the securing nuts 22.

In the final assembly, it will be seen that the louvres 27 extend inwardly beyond the wheel structure and beyond the plane of the tire side wall so that as the wheel revolves the louvres will scoop air from the air stream moving past the wheel and tire assembly and drive the air into the openings 29 for flow through the wheel structure around the brake housing 20 and out through the apertures 15 of the spider 14. Thereby cooling circulation of air about and past the brake housing or drum 20 is effected and promoted and overheating of the brake drum and brakes due to stagnation of air is prevented in the chamber roughly defined by the tire rim, wheel body and brake drum.

Figures 5 and 6 illustrate a modification of the cooling device in which a modfiied form of the securing member is used to hold the inner wall of the cooling device 25 against the shoulder 24 of the brake housing 20.

In this modification, finger-like members 33 are formed with pointed end portions having a length exceeding the offset of the shoulder 24 from the body of the brake housing 20. Thus, when the cooling device 25 is pressed against the housing 20 with the finger members 33 in engagement with the shoulder 24, the finger members 33 will be deflected as at 34, consequently, any force tending to displace the device 25, or move the device to the right as shown in Figures 5 and 6, will cause the ends of the finger members 33 to bite into the surface of the brake housing 20. Thus, the device is locked against lateral displacement when the tire rim 11 is removed.

From the foregoing, it will be seen that I have herein provided a device for efficiently cooling a brake assembly, the cooling device being easily insertable within the wheel structure and secured in a manner such that the housing need not be disturbed when the tire rim is removed from the wheel structure.

It will be evident that various modifications may be made through a wide range without departing from the principles of this invention and it is, therefore, not the purpose to limit the patent granted hereon otherwise than necessitated by the scope of the appended claims.

I claim as my invention:

1. In a wheel structure including a brake housing having an axially outwardly facing annular shoulder and a tire rim secured to said brake housing and having an inner side annular lip, a cooling device for the inner side of the wheel and for attachment to said brake housing comprising a ring having spaced air collecting portions for effecting air circulation over said brake housing, a flanged lip extending radially outwardly from the radially outer side of said ring for engagement with the lip of said tire rim, and a series of finger members projecting from the radially inner side of the ring and having pointed end portions extending to a smaller diameter than the diameter of the brake housing axially outwardly of said shoulder arranged to bite into the surface of the brake housing to resist displacement of the device when the tire rim is being removed.

2. In a vehicle wheel assembly including a brake drum and a wheel structure detachably secured concentric with the brake drum and having a tire rim encircling the brake drum in spaced relation and defining an air chamber between the tire rim and brake drum, said wheel including a wheel body having air circulation openings therethrough from said chamber, and an air circulation promoting member comprising a ring mounted across the inner side of said chamber between the tire rim and the brake drum and including spaced generally axially extending portions in tensioned engagement with respectively the tire rim and the brake drum, said member having air scooping means thereon for driving air from the inner side of the wheel assembly through said chamber and said wheel body openings.

3. In a vehicle wheel assembly including a brake drum and a wheel detachably secured concentrically thereto and having a wheel body and a tire rim, the wheel body having air circulation openings therethrough and the tire rim encircling the brake drum in spaced relation, an air circulator mounted between the tire rim and the brake drum at the inner side of the wheel and projecting inwardly from the wheel assembly to a position beyond the maximum inward spread of a tire carried by the tire rim, said air circulator having a pair of spaced generally axially outwardly extending legs each of which has a radially oppositely extending flange structure, the flange structure of the radially innermost leg engaging with the brake drum and the flange structure of the radially outermost leg engaging with the tire rim for retaining the air circulator in position.

4. In a vehicle wheel assembly including a brake drum and a wheel structure detachably secured concentric with the brake drum and having a tire rim encircling the brake drum in spaced relation and defining an air chamber between the tire rim and brake drum, the tire rim having a portion facing axially inwardly at the inner side of the wheel, and the brake drum having a shoulder thereon offset axially outwardly relative to said inwardly facing portion of the tire rim, an air circulator comprising an annular generally U-shaped member projecting inwardly relative to the wheel and substantially closing the inner side of the air chamber, air scooping and moving means on said circulator for effecting movement of air therethrough in the rotation of the wheel, means at the radially outer side of the air circulator engaging said axially inwardly facing portion of the tire rim, and means at the radially inner side of the air circulator engaging said shoulder on the brake drum, said radially outer and radially inner engaging means being offset corresponding to the offset relationship of the tire rim inwardly facing portion and said brake drum shoulder and in assembly being maintained under tension for maintaining snug engagement with respectively the tire rim and the brake drum.

5. In a wheel structure including a brake housing having an annular axially outwardly facing shoulder and a tire rim secured to said brake housing and having an inner annular lip defining a groove facing generally axially and radially inwardly, a cooling device for the inner side of the wheel to effect cooling air circulation about said brake housing and comprising a ring having spaced air collecting portions extending from the inner side of said wheel structure, a flanged lip extending from the radially outer side of said ring for snug internested engagement within the lip groove of said tire rim, and a series of finger-like members extending generally radially inwardly from the radially inner side of said ring for engaging the shoulder on said brake housing.

6. In a wheel structure including a brake housing having an external annular axially outwardly facing shoulder and a tire rim secured to said brake housing, said tire rim having an inner annular lip, a cooling device for the inner side of the wheel to effect cooling air circulation about said brake housing and comprising a ring having spaced air collecting portions extending from the inner side of said wheel structure, a flanged lip extending from the radially outer side of said ring having engagement with the lip of said tire rim, and a series of finger-like members extending generally radially inwardly from the radially inner side of said annular ring for contact against the shoulder of said brake housing, said finger-like members having pointed ends that tend to bite into the surface of the brake housing to resist displacement of said device.

7. In a brake drum cooling device, a ring structure having a series of openings therein and including air diverting elements at said openings for promoting circulation of air through said openings in the rotation of the ring, said ring having a generally axially extending flange thereon having a portion engageable retainingly with a portion of a wheel assembly, said flange portion including as marginal extensions thereon a plurality of generally radially angled retaining fingers diverging toward retaining tips engageable in wedging biting relation with a surface of said portion of the wheel assembly for retaining the ring structure on the wheel assembly.

8. In a brake drum cooling device, an annulus adapted to be mounted at the axially inner side of a wheel at the space between a brake drum and an encircling spaced tire rim, said annulus having air circulation promoting means thereon so that brake drum cooling air is circulated about the brake drum during rotation of the wheel with which the annulus may be assembled, said annulus having at the radially inner and axially outer portion thereof means for retainingly shouldering against a generally axially outwardly directed shoulder on the brake drum, said annulus having an axially inwardly offset relation and radially outwardly spaced from said shouldering means additional shouldering means directed generally axially outwardly for retainingly engaging against a generally axially inwardly directed shoulder on a tire rim, said annulus being of resilient construction for resilient retaining engagement when said shouldering means are interengaged with the brake drum and tire rim shoulders, respectively.

9. In a vehicle wheel assembly including a wheel body and a brake drum, with a tire rim carried by the wheel body and encircling a portion of the brake drum in spaced relation to define therewith an air chamber, the wheel body providing air circulation openings therethrough from said chamber, said tire rim providing at its inner side an axially inwardly directed shoulder, said brake drum providing an axially outwardly directed shoulder, an air circulation promoting annular member for substantially closing the inner side of said chamber between the tire rim and the brake drum and having respective shoulders thereon retainingly opposing the shoulders on respectively the tire rim and the brake drum, said member having opening therethrough and means thereon for effecting circulation of air therethrough and through said chamber and said wheel body openings in the rotation of the wheel.

GEORGE ALBERT LYON.

References Cited in the file of this patent

UNITED STATES PATENTS

| Number | Name | Date |
| --- | --- | --- |
| D. 103,682 | Kerr | Mar. 23, 1937 |
| 1,665,437 | Booth | Apr. 10, 1928 |
| 2,106,702 | Campbell | Feb. 1, 1938 |
| 2,143,950 | Kliesrath | Jan. 17, 1939 |
| 2,175,044 | Van Halteren | Oct. 3, 1939 |
| 2,265,938 | Eksergian | Dec. 9, 1941 |
| 2,312,159 | Gulotta | Feb. 23, 1943 |
| 2,433,854 | Lyon | Jan. 6, 1948 |
| 2,489,522 | Chase | Nov. 29, 1949 |

FOREIGN PATENTS

| Number | Country | Date |
| --- | --- | --- |
| 787,597 | France | Sept. 25, 1935 |